United States Patent Office 3,729,501
Patented Apr. 24, 1973

3,729,501
DIFLUOROAMINO ALIPHATIC COMPOUNDS
Gilson H. Rohrback, Whittier, and James H. Canfield, Anaheim, Calif., assignors to General Electric Company
No Drawing. Filed Aug. 25, 1961, Ser. No. 136,134
Int. Cl. C07c 77/02, 87/22
U.S. Cl. 260—467    2 Claims The present invention is directed to new compositions of matter which can be used as explosives or as ingredients in propellant compositions. The present invention also provides improved processes for the synthesis of such compositions.

The compounds of the present invention can be described by the following general formula:

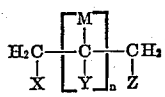

In the above formula, $n$ is an integer from 1 to 10, and preferably from 1 to 4, M is selected from the group consisting of H and $CH_2-NF_2$, and X, Y, and Z are selected from the group consisting of $NF_2, NO_2$ and $ONO_2$, with the proviso that the number of $NF_2$ groups is at least equal to $n$, but at least one $NO_2$ or $ONO_2$ group is present.

The compounds of the invention can be used, per se, as explosives, or they can be combined with other ingredients in the manufacture of propellant compositions with or without an additional oxidizing agent being added. The thermal stability and the impact sensitivity of these materials, and their high specific impulses make them particularly suitable for such propellant compositions.

An object of the present invention is to provide new compounds which decompose upon ignition to produce great volumes of gases.

A further object of the invention is to provide improved compounds suitable for incorporation in propellant compositions which provide thrusts of greater magnitude than presently employed propellants.

Still another object of the invention is to provide improved methods for the synthesis of the compounds described above.

As indicated by the foregoing generic formula, the compounds of the present invention include at least one difluoramino group and at least one nitro or nitrato group. The preferred compounds of the present invention contain from 3 to 6 carbon atoms.

The compounds of the present invention can be made starting with mono-olefinic compounds or with poly-olefinic compounds. In the case of mono-olefinic compounds, an alkenyl halide (chloride, bromide or iodide) can be reacted with tetrafluorohydrazine in a continuous reactor at temperatures from about 210° to 230° C. for about one-half to two minutes to replace the halide atom with the difluoramino group, while retaining the mono-olefinic unsaturation. This compound is then reacted with dinitrogen pentoxide in a solvent such as chloroform, or without a solvent in the presence of ozone to produce the difluoramino, dinitrato compound in which the nitrato groups are on adjacent carbon atoms.

In the case of polyolefinic starting materials, a typical reaction involves reacting a conjugated diolefin in gaseous phase with tetrafluorohydrazine at temperatures up to 90° C., pressures up to 25 pounds per square inch gauge, and times ranging from about one hour to twenty-four hours so that at least two difluoramino groups are added to the original carbon chain. The difluoramino compound is then reacted with dinitrogen pentoxide in chloroform solution at temperatures ranging from about —20° to —5° C. and times of about forty-eight to two hundred hours so that one or more nitrato groups are added to the hydrocarbon chain. Alternatively, the difluoramino compound can be reacted with a combination of dinitrogen pentoxide and ozone without a solvent, at temperatures of 10° to 30° C., at atmospheric pressure, and times from forty-five to ninety minutes to produce the same final product.

For the synthesis of compounds having two nitro groups or one nitro and one nitrato group, a difluoamino olefin is reacted at moderate temperatures with an equimolar quantity of dinitrogen tetroxide, either in the presence or absence of oxygen. Thus, the reaction of 1,4-bis(difluoramino) butene-2 with oxygen-free dinitrogen tetroxide would result in a mixture of 1,4-bis(difluoramino)-2,3-dinitrobutane and 1,4-bis(difluoramino)-2-nitro-3-nitritobutane, and this mixture would be separable by distillation. The nitrato compound would then be oxididized further to the nitrate.

A simpler preparation for this type of compound consists in reacting the difluoramino compound with dinitrogen tetroxide and oxygen. In the example given, this reaction results in a mixture of 1,4-bis(difluoramino)-2,3-dinitrobutane and 1,4-bis(difluoramino)-2-nitro-3-nitratobutane. This mixture can be separated by distillation.

EXAMPLE I

A nickel reactor having a volume of 2400 cc. was evacuated to a pressure of less than 1 millimeter of mercury absolute. A total of 2.2 grams (0.040 M) of butadiene was introduced into the reactor while the reactor was cooled to —78° C. A total of 4.4 grams (0.042 M) of terafluorohydrazine was then introduced into the reactor. The reactor was allowed to warm to room temperature and heated by a water bath to 80° C. During this time, the pressure decreased over a period of two hours from 740 millimeters absolute to 185 millimeters absolute. 6.6 grams of the crude product was isolated, and fractionally distilled to yield the following fractions:

| Fraction | Boiling range | Amount, g. |
|---|---|---|
| I | 22–50° C., 113 mm | 0.4 |
| II | 50–52° C., 113 mm | 1.3 |
| III | 52–83° C., 113 mm | 0.4 |
| IV | 83–87° C., 113 mm | 3.3 |

Fraction II represented a 20% yield of the compound 1,2-bis(difluoramino)butene-3, while Fraction IV represented a 50% yield of the compound 1,4-bis(difluoramino) butene-2.

Dinitrogen pentoxide in an amount of 9.2 grams (0.085 M) was transferred under dry nitrogen to 100 millimeters of dry chloroform at 0° C. The solution was cooled to —60° C. with some solid precipitation. A 10.0 gram (0.063 M) portion of 1,4-bis(difluoramino) butene-2 was added and the flask was protected by a drying tube filled with Drierite dessicant. The mixture was allowed to stand for ten days at —10° C.

The unreacted starting materials and solvents were stripped in a rotary evaporator up to 0° C. at approximately 1 millimeter pressure. The crude product obtained weighed 9.5 grams. This product was vacuum distilled in a 9-inch Vigreaux column with the following fractions:

| Fraction | Boiling range | Amount, g. |
|---|---|---|
| I | To 30° C., 0.15 mm | 1.0 |
| II | 30–62° C., 0.10 mm | 0.3 |
| III | 62–65° C., 0.10 mm | 3.6 |
| IV | 65–68° C., 0.10 mm | 0.4 |

Fractions III and IV were spectrally identical, and represented a total of a 30% yield, based upon the starting olefin.

The infrared spectrum of this material showed absorptions at 6.0 and 7.85 microns, characteristic for the $CONO_2$ grouping. The nuclear magnetic resonance spectrum indicated that the difluoramino groups are on the terminal carbon atoms, and that the molecule is symmetrical. The polarographic analysis indicated that there was an absence of $CNO_2$ groups. The molecular structure was therefore established to be the following:

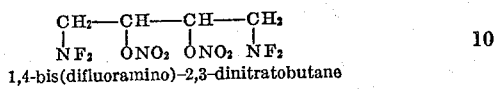

1,4-bis(difluoramino)-2,3-dinitratobutane

This compound had a density of 1.7 grams per cc. and had an autoignition temperature of 195° C. It had an impact sensitivity of 1 centimeter when measured with a 2 kilogram weight on a sample of glass cloth saturated with the material. The normally liquid compound solidified to an amorphous mass at −25° C.

EXAMPLE II

One gram of 1,2-bis(difluoramino) butene-3 was treated with approximately 1.0 gram of dinitrogen pentoxide at −50° C. The mixture was allowed to warm to room temperature, and then evacuated at less than 1 millimeter pressure, at 25° C. The crude product obtained weighed about 1 gram.

To 4.2 grams of 1,2-bis(difluoramino)-butene-3 (0.026 M) was added 4.83 grams (0.045 M) solid dinitrogen pentoxide, and the temperature maintained at −50° C. The mixture was allowed to warm to room temperature, with some evolution of brown oxides of nitrogen, and the temperature rose to 40° C. This material was evacuated at less than 1 millimeter pressure at 25° C. to give 4.8 grams of the crude material.

The two samples thus produced were combined for distillation. The following fractions were obtained:

| Fraction | Boiling range | Amount, g. |
| --- | --- | --- |
| I | To 64° C., 0.21 mm | 1.0 |
| II | 64–69° C., 0.19 mm | 0.7 |
| III | 69–76° C., 0.21 mm | 1.6 |
| IV | 76–78° C., 0.21 mm | 0.8 |

Fractions III and IV were spectrally identical, and represented a combined yield of 27%, based on the starting olefin. This synthesis resulted in the following product:

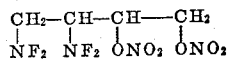

The final product had a boiling range of 46° to 49° C. at 0.1 millimeter pressure, and a density of 1.6 grams per cc. It had an autoignition temperature of 191° C. Its impact sensitivity was 2 centimeters in the drop weight test using a 2 kilogram weight on a sample of the material saturated into a glass cloth. Its infrared spectrum indicated absorptions at 6.05 and 7.85 microns. It set to an amorphous mass at −25° C.

EXAMPLE III

Allyl bromide was introduced into a continuous reactor at a flow rate of 0.073 gram per minute, together with tetrafluorohydrazine at the rate of 4 cc. per minute, and helium at the rate of 176 cc. per minute. The reactor was at a temperature of 210° C. The product collected over five hours was distilled in a 24-inch column packed with ceramic Berl saddles. An amount of product of 3.8 grams, boiling at 40° to 42° C. at atmospheric pressure was obtained, representing a 20% conversion of allyl bromide to allyl difluoramine.

Twelve grams (0.13 M) of dinitrogen pentoxide was added to 75 ml. of chloroform and stirred vigorously. 8.7 grams of allyl difluoramine was added gradually with continuous stirring in an atmosphere of nitrogen. The entire solution was maintained at a temperature of −20° C. After the addition had been completed, the reaction flask was placed in a cold box maintained at a temperature of −10° C. Approximately forty-eight hours later, the chloroform was taken off on a rotary evaporator. The yellow-green oil remaining weighed 12 grams, and represented a 55% yield.

The purified product evidenced infrared absorptions at 6.05 and 7.85 microns. It had a boiling range of 50° to 51° C. at 0.1 millimeter, and a density of 1.5 grams per cubic centimeter. The chemical structure of the final product is represented by the following:

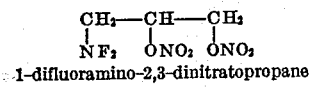

1-difluoramino-2,3-dinitratopropane

While the foregoing examples deal specifically with several members of the generic class referred to previously, the synthesis of other members of the class proceeds in the same manner, with suitable variation in the amount of reactants employed and with suitable changes in temperatures and pressures.

For example, the types of syntheses detailed above may be employed to produce the following compounds:

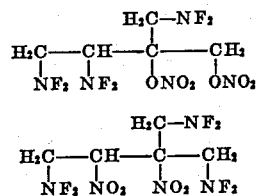

The compounds of the present invention can be combined with other ingredients in the manufacture of propellants, either of the mono-propellant or bi-propellant type. A suitable range of composition for using the compounds of the present invention in propellant compositions is given below:

| | Parts by wt. |
| --- | --- |
| Propellant compound | 21.6–67.5 |
| Adiponitrile (plasticizer and densensitizer) | 2.5–7.5 |
| Pentaerythritrol trinitrate (oxidizer) | 0–45 |
| Nitrocellulose (binder) | 23.75–28.5 |
| Ethyl centralite | 1.25–1.5 |

In the above formulations, a sufficient amount of the binder is added to provide a gel of the required consistency for use as a propellant.

The specific impulse values for various combinations employing the compounds of the present invention have been calculated based upon an expansion from a chamber pressure of 1,000 p.s.i. down to 14.7 p.s.i. The specific formulations and their specific impulse values are given in the following example.

EXAMPLE IV 1,4-bis(difluoramino)-2,3-dinitratobutane

| | | |
| --- | --- | --- |
| | parts | 67.5 |
| Adiponitrile | do | 7.5 |
| Nitrocellulose | do | 23.75 |
| Ethyl centralite | do | 1.25 |
| Calculated chamber temperature | ° K | 3242 |
| Calculated exhaust temperature | ° K | 1310 |
| Calculated specific impulse | sec | 267 |

EXAMPLE V 1,4-bis(difluoramino)-2,3-dinitratobutane

| | | |
| --- | --- | --- |
| | parts | 22.5 |
| Adiponitrile | do | 2.5 |
| Pentaerythritrol trinitrate | do | 45.0 |
| Nitrocellulose | do | 28.5 |
| Ethyl centralite | do | 1.5 |
| Calculated chamber temperature | ° K | 2923 |
| Calculated exhaust temperature | ° K | 1283 |
| Calculated specific impulse | sec | 250.3 |

EXAMPLE VI

| 1,4-bis(difluoramino)-2,3-dinitratobutane | | |
|---|---|---|
| | parts | 21.6 |
| Adiponitrile | do | 4.2 |
| Pentaerythritrol trinitrate | do | 44.2 |
| Nitrocellulose | do | 28.5 |
| Ethyl centralite | do | 1.5 |
| Calculated chamber temperature | °K | 2794 |
| Calculated exhaust temperature | °K | 1198 |
| Calculated specific impulse | sec | 246.0 |

It will be evident that various modifications can be made to the described embodiments without departing from the scope of the present invention.

We claim as our invention:
1. 1,4-bis(difluoroamino)-2-nitro-3-nitratobutane.
2. The compound represented by the formula:

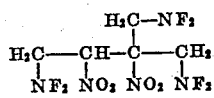

References Cited

UNITED STATES PATENTS

| 2,698,728 | 12/1954 | Kincade et al. | 149—92 |
| 2,975,208 | 3/1961 | Myers et al. | 260—467 |
| 2,981,618 | 4/1961 | Walton | 149—92 |
| 3,000,928 | 9/1961 | Frankel | 260—467 |
| 3,331,867 | 7/1967 | Smiley | 260—467 |
| 3,347,904 | 10/1967 | Smiley | 260—467 |
| 3,351,663 | 11/1967 | Guthrie | 260—583 |

LELAND A. SEBASTIAN, Primary Examiner

U.S. Cl. X.R.

149—18, 92, 109; 260—583 NH